United States Patent [19]

Holt

[11] Patent Number: 5,748,066

[45] Date of Patent: May 5, 1998

[54] CARTRIDGE MOTION INITIATOR WITH REPLACEABLE LINK WIRE CONTROLLER

[75] Inventor: Andrew J. Holt, Camarillo, Calif.

[73] Assignee: G & H Technology, Inc., Camarillo, Calif.

[21] Appl. No.: 711,219

[22] Filed: Sep. 9, 1996

[51] Int. Cl.⁶ .................... H01H 37/00; H01H 71/18; B23Q 1/68

[52] U.S. Cl. .................... 337/1; 337/5; 337/140; 403/2; 74/2

[58] Field of Search .................... 337/1–5, 140; 74/2; 137/76; 403/2, 28

[56] References Cited

U.S. PATENT DOCUMENTS

| | | | |
|---|---|---|---|
| 3,163,732 | 12/1964 | Abbott | 74/2 |
| 3,359,804 | 12/1967 | Phillips | 74/2 |
| 3,695,116 | 10/1972 | Baur | 74/2 |
| 3,924,688 | 12/1975 | Cooper | 74/2 |
| 4,906,962 | 3/1990 | Duimstra | 337/239 |
| 5,471,888 | 12/1995 | McCormick | 74/2 |
| 5,606,889 | 3/1997 | Bielinski et al. | 74/2 |
| 5,621,373 | 4/1997 | McCormick | 337/1 |

*Primary Examiner*—Leo P. Picard
*Assistant Examiner*—Jayprakash N. Gandhi
*Attorney, Agent, or Firm*—George J. Netter

[57] ABSTRACT

A controller (24) is provided to selectively release an initiator (12) having first and second members (14,16) that clampingly engage an object (18) preventing it from moving in an urged direction. A spring wire coil (20) holds the members (14,16) tightly about the object, one coil end affixed to one of the members and the other coil end is held by a pair of link wire loops (82,86) of the controller (24) which is also removably secured to one of the members (14,16) by a bolt (36). When it is desired to release the object (18) an electric current is passed through the link wire loops (82,86) of sufficient magnitude to cause the loops to break, releasing the coil (20) to unwind and, in turn, release the object for urged movement.

13 Claims, 3 Drawing Sheets

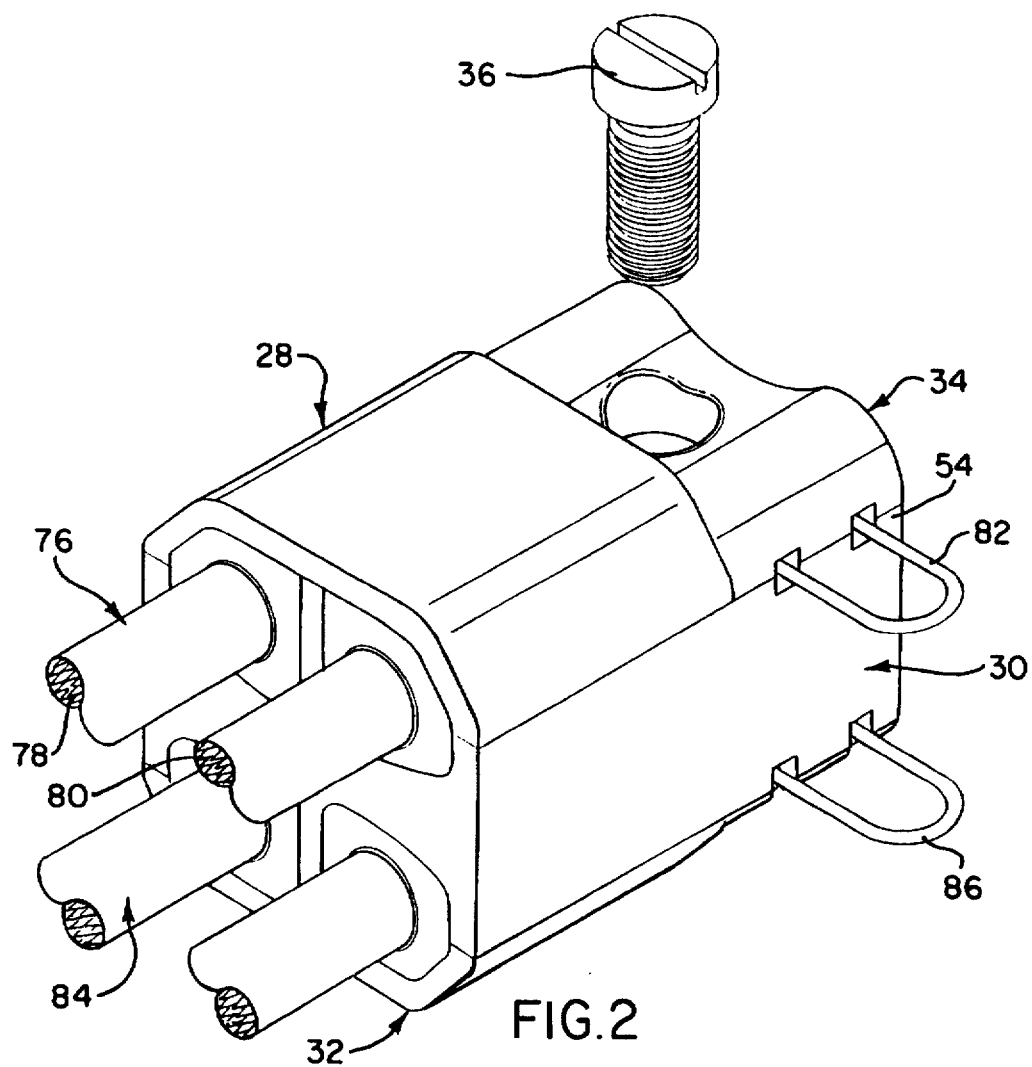
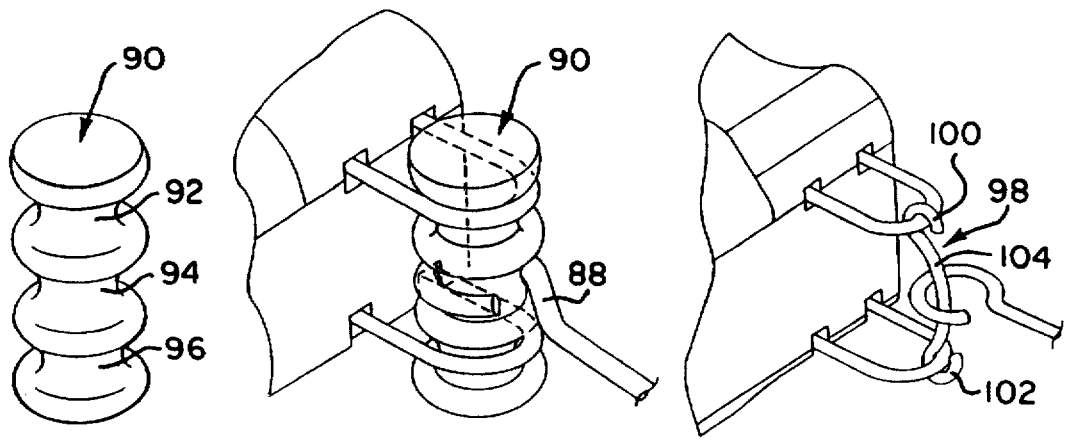

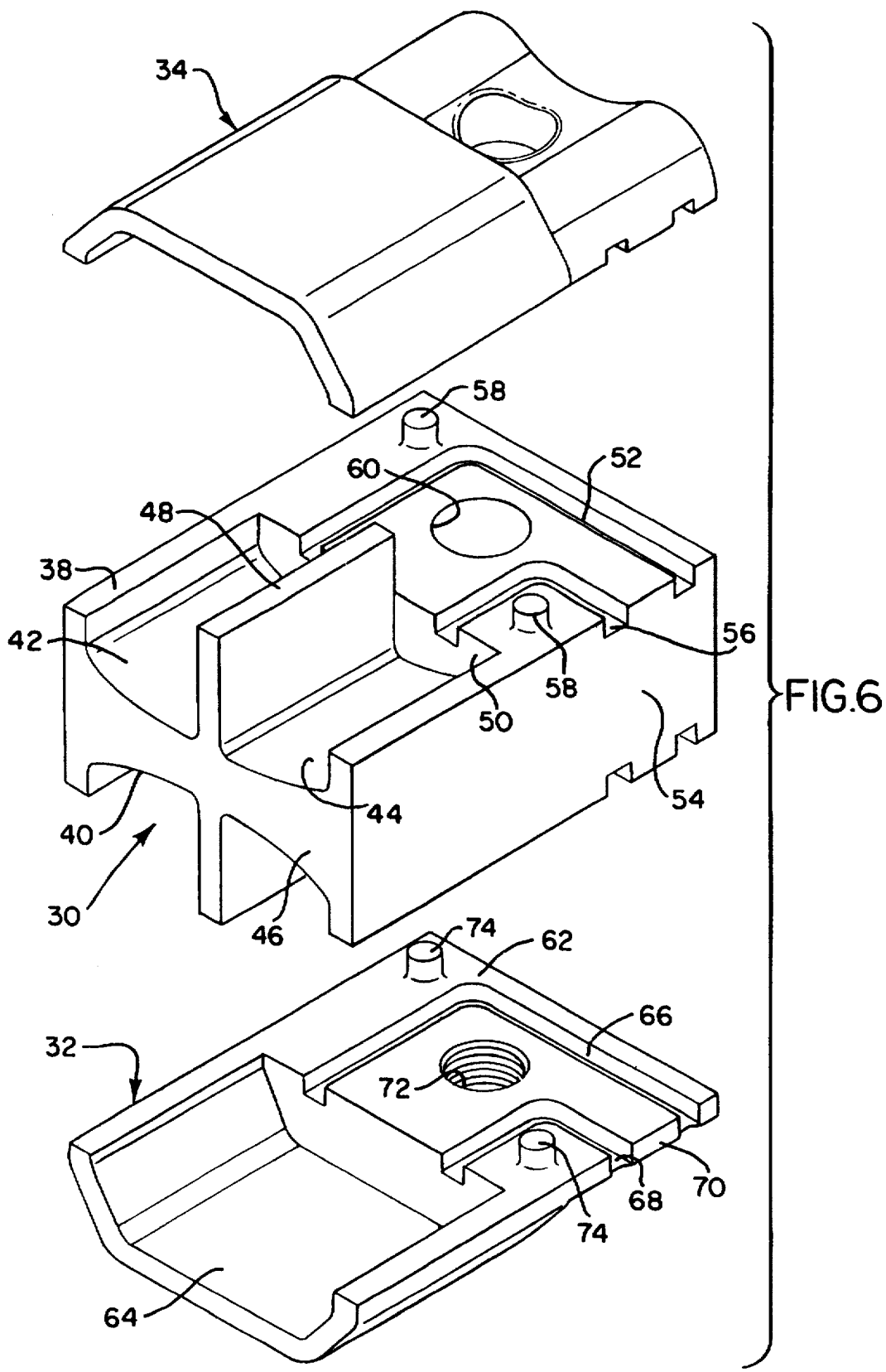

CARTRIDGE MOTION INITIATOR WITH REPLACEABLE LINK WIRE CONTROLLER

BACKGROUND

1. Field of the Invention

The present invention relates generally to a motion initiator for an object or shaft and, more particularly, to such an initiator having a replaceable cartridge-like control enabling repeated use of the initiator.

2. Description of Related Art

It is an essential requirement for the safety of personnel and equipment in many circumstances (e.g., fire control systems) to initiate movement of a shaft for example, in a precisely timed manner and with absolute reliability. One commonly employed technique heretofore has been to spring-load an object urging motion in a desired direction and at the same time employing means physically restraining the object from motion. At the desired moment to initiate object motion, an explosive means was detonated to destroy the restraining means and at the same time release the object for spring induced motion. The use of explosive release is, however, just not feasible for many environments in view of potential damage to other equipment or personnel.

Another technique is that of U.S. Pat. No. 3,924,688 in which a spring-loaded object to be moved is restrained by a pair of members sandwiched about the object and a spring-wire helical coil wrapped about the members secures the assembly. A so-called hot wire engages a hook end of the spring coil preventing it from unraveling. When it is desired to cause the object to move by virtue of its spring load, a sufficiently large electric current was passed through the hot wire to destroy the hot wire which allowed the innate spring force to unravel the coil and remove the restraint from the object.

The patented system although providing operation that would be considered satisfactory from many standpoints, is subject to the deficiency that on use it is not readily placed in condition for use again. This is unfortunate in that many fire systems, for example, require multiple preliminary test runs as well as other subsequent runs, so that use of the patented system in this case would present repeated relatively difficult disassembly/assembly steps for each use.

U.S. patent application Ser. No. 08/514,804, U.S. Pat. No. 5,621,373 NON-EXPLOSIVE INITIATOR, by Larry L. McCormick, assigned to the same assignee as the present application, discloses an insulator body clamped together with spool means by a coil spring to retain an object from moving. A link wire is mounted within the insulator body and extends outwardly for securing an end of the coil spring. Electrical destruction of the link wire releases the spring and object. To replace the insulator body with a new unbroken link wire requires removal of the coil spring and then the insulator body with subsequent reassembly for use.

SUMMARY OF THE INVENTION

The initiator of the present invention includes first and second members which are received about an object being urged for movement in a given direction (e.g., spring-loaded). The members have internal parts conformed to restrainingly grip the object. A helical oversized coil of spring wire is compressingly formed about the object when in armed mode to maintain the members in gripping condition about the object and a controller on being selectively actuated releases the wire coil and thus the object for movement.

The controller includes a housing which is releasably secured to one of the members and has a pair of loops made from an electrically frangible wire connected to an electrical power source. An end portion of the coil spring is formed into a hook which is physically engaged with the frangible wire loops via an intermediate connector. When it is desired to release the object for movement, an electric current is passed through the two loops and on one or both of the loops breaking releases engagement of the coil spring end portion. Due to the inherent spring characteristics of the wire coil it unravels allowing the two members to separate and setting the object free for movement.

To use the initiator again, the controller is dismounted from the initiator member and replaced by another fully assembled controller without having to remove the spring coil. Alternatively, a used controller can have its broken wire loops replaced by unbroken wire loops and the refurbished controller remounted on the initiator member for use as before.

The intermediate connector has each of its opposite end portions engaged with a frangible wire loop and the hooked end portion of the spring coil engaging a central portion of the connector. Accordingly, if only one of the loops is broken by an applied electrical current the hooked end portion of the spring coil is still released.

BRIEF DESCRIPTION OF THE DRAWING

The above-described objects and advantages of the present invention will become more readily apparent upon reference to the detailed description that follows with reference to the attached drawings, in which:

FIG. 2 is an enlarged perspective view of a controller of this invention;

FIG. 3 is an isometric depiction of an intermediate connector;

FIG. 4 is an isometric view of the intermediate connector of FIG. 3 shown in armed engagement;

FIG. 5 is a depiction of an alternative intermediate connection means; and

FIG. 6 is an exploded view of the controller of FIG. 2.

DESCRIPTION OF PREFERRED EMBODIMENTS

Figure 1:
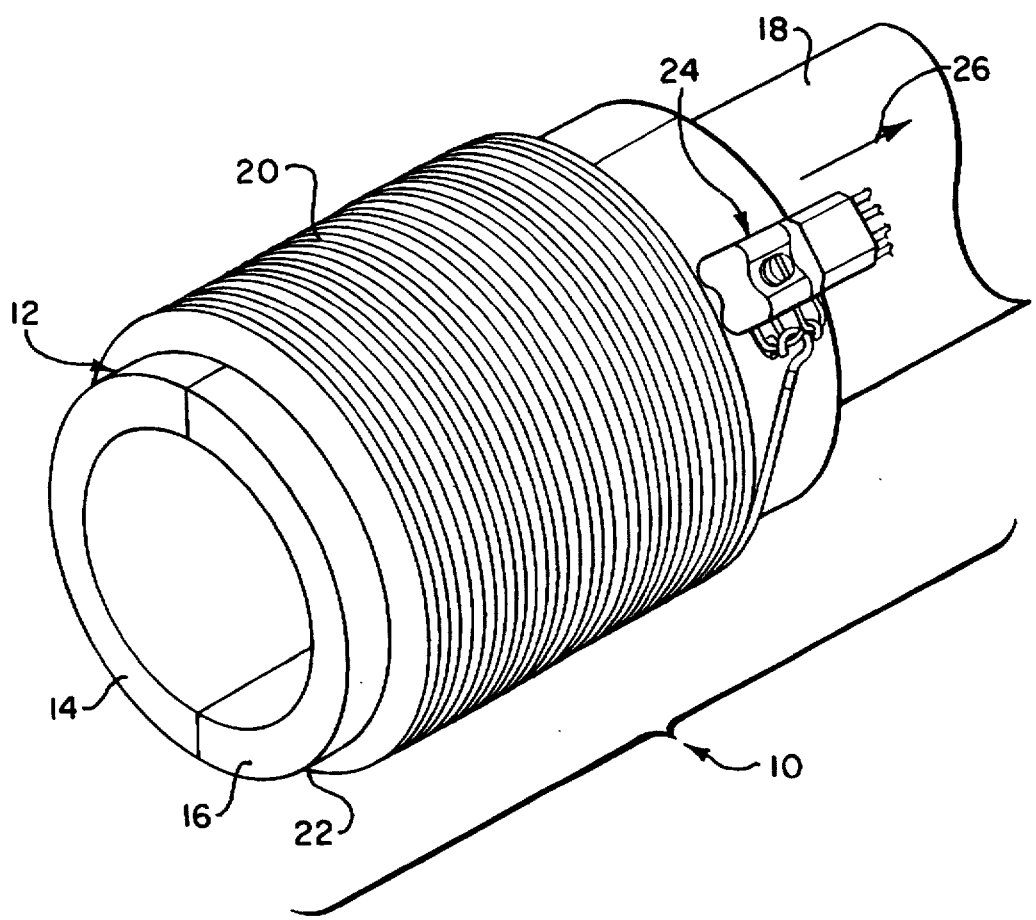
FIG. 1 is a perspective view of an initiator and controller of the present invention.

With reference now to the drawing and particularly to FIG. 1, an initiator and controller fully assembled in armed condition to prevent movement are enumerated generally as 10. More particularly, the initiator 12 includes first and second half-shell members 14 and 16 releasably and clampingly received about an object 18 (e.g., shaft). A spring-wire helical coil 20 is dimensioned such that when it is relaxed (i.e., unarmed mode) it assumes a relatively large cross-section so as not to compress the members 14 and 16 about the object. On the other hand, with the one coil end portion anchored to a member as at 22 and the other coil end portion pulled tightly and held by the controller 24 in a way that will be more particularly described, the object is held firmly against movement which is being induced in the direction of the arrow 26.

For the ensuing detailed description of the controller 24, reference is made to simultaneously to FIGS. 2 and 6. The controller includes a housing 28 having first, second and third parts 30, 32, and 34 constructed of an electrical insulating material (e.g., plastic). As will be more particularly described, the parts 30-34 are assembled together as a unit for being mounted onto one of the half-shell members 14 or 16 by use of a threaded bolt 36.

The first housing part 30 forms the central section of the housing and has a pair of opposite surfaces 38 and 40 which are configured identically, but for simplicity only the configuration of surface 38 will be described in detail (FIG. 6). The surface 38 has first and second shallow chambers 42 and 44 located side by side and opening outwardly at a common end wall 46 of the part 30. An upstanding wall 48 separates the two chambers.

Beginning at an internal end wall 50 of chamber 42, a generally L-shaped, open-topped guide slot 52 extends to a side wall 54 where it opens to the exterior. A further guide slot 56 is formed in the surface 38 extending from the second chamber 44 along an L-shaped path parallel to the slot 52 to exit at the side wall 54 adjacent the exit point of slot 52.

The surface 38 further includes a pair of upstanding supports 58 for a use that will be described. At a point intermediate the two guide slots, there is provided an opening 60 for receiving the bolt 36 during mounting.

The opposite surface 40 is configured the same as surface 38 except the guide slots formed therein are substantially parallel to the guide slots on surface 38.

The controller housing parts 32 and 34 are similarly constructed of an electrically insulative material and each has an identically configured surface except that certain features are formed mirror-image of each other. Accordingly, only part 32 shown best in FIG. 6 will be described in detail.

The surface 62 of the part 32 which faces toward part 30 in assembly includes an open-topped entrance chamber 64 of dimensions approximating the combined transverse dimensions of shallow chambers 42 and 44 in part 30. First and second generally L-shaped slots 66 and 68 are formed in surface 62 and extend along parallel paths with their respective ends terminating in the chamber 64 and a side edge wall 70. An opening 72 is located between the two guide slots and a pair of upstanding spacers 74 are provided for a purpose to be described.

With reference now particularly to FIG. 2, it is seen that in assembly of the controller, a first cable wire 76 has insulative-covered portions 78 and 80 which are positioned within the chambers 42 and 44, respectively, and an intervening portion with heavy insulation removed extends outwardly of sidewall 54 in a loop 82. The part 34 is then positioned over the surface 38 and the relative dimensions are such that the cable wire is held securely therebetween with the insulated parts in the internal chambers and the uninsulated portions held within the guide slots.

Similarly, another cable wire 84 with an intermediate portion bare of heavy insulation is positioned within the remaining configured surface of the part 30 and covered by part 32 as already described. A second wire loop 86 extends outwardly of the controller housing and the two wire loop openings are generally aligned (FIG. 2). The bolt 36 is then passed through the aligned openings in housing parts 30-34 and screwed into an opening in the outer surface of one of the members 14 and 16 (not shown).

In use, a hooklike end portion 88 of helical wire 20 is lockingly engaged with the two loops 82 and 86 via an intermediate connector 90. Specifically, in accordance with a first embodiment of the invention, the intermediate connector includes a generally cylindrical body constructed of a good electrical insulating material (e.g., ceramic) having first, second and third circumferentially extending, spaced-apart slots 92, 94 and 96, respectively (FIG. 3). As shown in best in FIG. 4, interconnection is achieved by mechanically positioning the wire coil end portion 88 in the middle slot (94) and the wire loops 82 and 86 in slots 92 and 96, respectively. The relative dimensions of the wire loops, coil end portion and connector slots are such that once assembled together they will maintain assembled condition with a certain amount of tensile stress from the wire coil being exerted against the wire loops.

A motion initiator in fully armed mode and using a controller of the present invention is depicted in FIG. 1. When it is desired to release the object 18 for induced motion in the direction indicated by arrow 26, an electric current is passed simultaneously through the cable wires 76 and 84, and thus through the loops 82 and 86, of sufficient amount to cause the loops to break under the stress imposed by the wire coil. On breakage of either or both wire loops the wire coil hooklike end portion is released effecting unraveling of the wire coil, release of the half-shell members 14 and 16 and the object for movement.

For an alternative embodiment of intermediate connector, reference is made to FIG. 5. The connector 98 consists of an elongated member of electrically insulative material having hooked ends 100 and 102 with a generally curved intermediate portion 104. In use, the hooked ends respectively engage the wire loops 82 and 86 while the hooklike end portion 88 of the wire coil engages the curved portion 104 applying tensile stress op the loops as in the first described embodiment.

In accordance with the practice of the described invention there is provided a controller for an object motion initiator in which first and second frangible wire loops are physically linked to a hooked end of a wire coil securing members that hold the object back from movement. Interconnection is made by positioning the two coils and wire coil end in spaced apart relation with the wire coil end between the connection points of the two coils. In this manner, if only one of the wire loops breaks a cantilever effect is produced which releases the object for movement thereby improving operational reliability.

Although the present invention has been described in connection with preferred embodiments, it is to be understood that those skilled in the appertaining arts may make changes coming within the spirit of the invention as described and within the scope of the appended claims.

What is claimed is:

1. Apparatus for controlled releasing of an object to move under continuously applied force, comprising:

at least two separable members releasably engaging the object to restrain object motion;

a spring wire coil arranged about the members holding the object therewithin; and first and second electrically destructible wires fixedly mounted on one of said members and physically engaging an end portion of the coil spring wire maintaining the coil about the object;

said first and second destructible wires on being subjected to an electric current of predetermined magnitude and at least one of the said wires destructing releases the wire coil and members allowing the object to move.

2. Apparatus as in claim 1, in which an electrically insulative connector simultaneously engages the first and second wires and the coil spring wire end portion.

3. Apparatus as in claim 2, in which the first and second wires are formed into first and second loops and the coil end portion is formed into a hook; said connector including three spaced apart peripheral slots, one of said slots located intermediate the other two slots; said hook being received in the intermediate slot and said loops are respectively received within the other slots.

4. Apparatus as in claim 2, in which the first and second wires are formed into first and second loops and the coil end portion is formed into a hook; said connector including a length of wire formed into a curve with a hook at each end, said curved wire hooks being engaged respectively with the first and second hooks, and the coil end portion hook engaging said curved wire for maintaining the coil spring wire in full wound mode.

5. Apparatus as in claim 1, in which the first and second wires are sandwiched between electrically insulative parts forming a housing, with portions of the wires extending externally of the housing in first and second loops; said housing including an aligned opening extending through the housing parts, and a bolt received in the housing opening and threaded within an appropriately threaded opening in one of the separable members.

6. Apparatus as in claim 3, in which the connector is constructed of ceramic and is generally cylindrical having three circumferentially extending slots spaced apart along the cylindrical axis, one of said slots lying intermediate the other two slots and receiving the wire coil end portion hook, the other two slots receiving the wire loops respectively.

7. Apparatus as in claim 5, in which said housing includes a first part having opposite surfaces, each surface configured to include a pair of slots for respectively receiving a destructible wire therein with a wire loop extending outwardly of a common side; second and third housing parts fitted in covering relation over the respective first part opposite surface.

8. In apparatus for selectively releasing of an object to move under an applied force where at least two separable members releasably engages the object and a spring-wire coil is arranged about the members holding the object therewithin and restraining the object from moving under the applied force, comprising:

first and second electrically destructible wire loops fixedly mounted to one of said members and physically securing an end portion of the coil spring wire in position to maintain the coil about the object; and electrically insulative parts forming a housing for the destructible wires, with portions of the wires extending externally of the housing in said first and second loops.

9. Apparatus as in claim 8, in which an electrically insulative connector simultaneously engages the first and second wire loops and the coil spring wire end portion.

10. Apparatus as in claim 9, in which the coil end portion is formed into a hook; said connector including three spaced apart peripheral slots, one of said slots located intermediate the other two slots; said hook being received in the intermediate slot and said loops are respectively received within the other two slots.

11. Apparatus as in claim 8, in which the coil end portion is formed into a hook; said connector including a length of wire formed into a curve with a hook at each end, said curved wire hooks being engaged respectively with the first and second hooks, and the coil end portion hook engaging said curved wire for maintaining the coil spring wire in full wound mode.

12. Apparatus as in claim 10, in which the connector is constructed of ceramic and is generally cylindrical having three circumferentially extending slots spaced apart along the cylindrical axis, one of said slots lying intermediate the other two slots and receiving the wire coil end portion hook, the other two slots receiving the wire loops respectively.

13. Apparatus as in claim 8, in which said housing includes a first part having opposite surfaces, each surface configured to include a pair of slots for respectively receiving a destructible wire therein with a wire loop extending outwardly of a common side; second and third housing parts fitted in covering relation over the respective first part opposite surface.

* * * * *